United States Patent
Lin et al.

(10) Patent No.: US 7,385,422 B2
(45) Date of Patent: Jun. 10, 2008

(54) TRI-STATE OUTPUT LOGIC WITH ZERO QUIESCENT CURRENT BY ONE INPUT CONTROL

(75) Inventors: Shui-Mu Lin, Taichung (TW);
Chien-Sheng Chen, Maio-Li (TW);
Nien-Hui Kung, Miao-Li (TW);
Der-Jiunn Wang, Hsin-Chu (TW);
Jing-Meng Liu, Hsin-Chu (TW);
Wei-Hsin Wei, Hsin-Chu (TW)

(73) Assignee: Richtek Technology Corporation, Hsinchu Hsien (TW)

( * ) Notice: Subject to any disclaimer, the term of this patent is extended or adjusted under 35 U.S.C. 154(b) by 104 days.

(21) Appl. No.: 11/217,341

(22) Filed: Sep. 2, 2005

(65) Prior Publication Data

US 2006/0279331 A1    Dec. 14, 2006

(30) Foreign Application Priority Data

Jun. 14, 2005    (TW)  .............................. 94119686 A

(51) Int. Cl.
*H03K 19/02*    (2006.01)
(52) U.S. Cl. .......................................... 326/59; 326/60
(58) Field of Classification Search .................. 326/59, 326/60
See application file for complete search history.

(56) References Cited

U.S. PATENT DOCUMENTS

| | | | | |
|---|---|---|---|---|
| 3,851,189 A | * | 11/1974 | Moyer .......................... | 327/210 |
| 3,969,633 A | * | 7/1976 | Paluck et al. .................. | 326/60 |
| 4,005,315 A | * | 1/1977 | Blauschild ..................... | 326/60 |
| 4,100,429 A | * | 7/1978 | Adachi .......................... | 326/60 |
| 4,115,706 A | * | 9/1978 | Yamaguchi ................... | 326/60 |
| 4,207,792 A | * | 6/1980 | Hoskinson .................... | 84/602 |
| 4,250,407 A | * | 2/1981 | Dorey et al. ................... | 326/47 |
| 4,449,065 A | * | 5/1984 | Davies, Jr. .................... | 326/60 |
| 4,465,944 A | * | 8/1984 | Shin ............................. | 326/60 |
| 5,198,707 A | * | 3/1993 | Nicolai ......................... | 326/98 |
| 5,598,110 A | * | 1/1997 | Chang .......................... | 326/60 |
| 5,610,537 A | * | 3/1997 | Hastings ....................... | 326/59 |
| 6,133,753 A | * | 10/2000 | Thomson et al. ............. | 326/56 |

* cited by examiner

*Primary Examiner*—Kenneth B. Wells
(74) *Attorney, Agent, or Firm*—Birch, Stewart, Kolasch & Birch, LLP

(57) ABSTRACT

A voltage generating circuit, which generates tri-state logic output in accordance with high, low or floating of the input node, is proposed. The present voltage generating circuit includes: a pulse generating circuit for generating a plurality of pulses; a voltage selecting circuit having a pair of NMOS transistors coupled in common source, each drain of the NMOS transistors is coupled to a current source respectively, both gates of the NMOS transistors are coupled to an input node, and the paired drain of the NMOS transistors generate a pair of voltage output; a plurality of flip-flops, which couple to drains of the NMOS transistors to lock the voltage output of the NMOS transistors in accordance with the pulses; an inner voltage-generating unit couples to the input node for providing a floating voltage level; and a plurality of switches controlled by the pulses for controlling the normal operation of the voltage selecting circuit and the conduction between the inner-voltage generating unit with the input node.

16 Claims, 3 Drawing Sheets

TRI-STATE OUTPUT LOGIC WITH ZERO QUIESCENT CURRENT BY ONE INPUT CONTROL

BACKGROUND OF THE INVENTION

1. Field of the Invention

The present invention generally relates to a voltage generating circuit, and more particularly relates to a voltage generating circuit for generating tri-state output logic by one input control.

2. Description of the Prior Art

In electronic circuits, stable power supply deeply concerns the performance of an electronic device. Unstable power supply may cause operation errors in the electronic device, or further damage the electronic device and decrease its working life. Referring to FIG. 1, the voltage generating circuit 10 provides output voltage 102 to the voltage monitoring circuit 14. Voltage monitoring circuit 14 detects the output voltage 102 and then compares it with a voltage reference 106. When output voltage 102 is smaller than the reference voltage 106, the voltage monitoring circuit 14 generates an alarm signal 108 to processor 12 for triggering the protection mechanism of the processor 12.

Generally, the output voltage 102 of the voltage generating circuit 10 is not fixed but has various selecting voltage levels to fit each kind of applications. An exemplary voltage generating circuit could be a voltage divider, which generates two outputs (with two selecting voltage levels) in accordance with a binary signal inputted via a programmable pin. In other words, one input generates two outputs. Therefore, there are at most $2^N$ combinations of output voltage levels when having N programmable pins for receiving N inputted setting voltages. For another example, U.S. patent application Ser. No. 2004/0085053 "Programmable voltage supervisory circuit and method with minimum programming pins and low quiescent current" discloses a voltage monitoring circuit, herein provides a voltage generating circuit that capable of generating tri-state output logic by one input control.

It's well known that how to decrease power consumption is one important issue to many electronic devices. The voltage monitoring circuit of the aforementioned U.S. patent application utilizes a sample-and-hold method to save power consumption. In order to reduce the whole power consumption of an electronic device (referring to the system shown in the FIG. 1), however, to reduce the power consumption of the voltage generating circuit is the most straightforward. According to this motivation, a voltage generating circuit, which generates tri-state output by one input control and has very low quiescent current, is provided.

SUMMARY OF THE INVENTION

In view of the above description, an object of the present invention provides a voltage generating circuit for producing tri-state output according to a high, low, or floating of a binary input signal.

It is another object of the present invention to provide a voltage generating circuit, which consumes very low power and very small quiescent current when generating tri-state output voltages.

Accordingly, a voltage generating circuit of the present invention is proposed, which includes: a pulse generating circuit for generating a plurality of pulses; a voltage selecting circuit having a pair of NMOS transistors coupled in common source, each drain of the NMOS transistors is coupled to a current source respectively, both gates of the NMOS transistors are coupled to an input node, and the paired drain of the NMOS transistors generate a pair of voltage output; a plurality of flip-flops, which couple to drains of the NMOS transistors to lock the output voltage of the NMOS transistors in accordance with the pulses; an inner voltage-generating unit couples to the input node for providing a floating voltage level; and a plurality of switches controlled by the pulses for controlling the normal operation of the voltage selecting circuit and the conduction between the inner voltage-generating unit with the input node. Wherein, the NMOS transistor could be enhancement mode or depletion mode, and the flip-flop could be a D flip-flop.

BRIEF DESCRIPTION OF THE DRAWINGS

Other objects, features, and advantages of the invention will become apparent from the following detailed description of the preferred embodiments with reference to the accompanying drawings in which.

DESCRIPTION OF THE PREFERRED EMBODIMENTS

Some preferred embodiments of the present invention will be described in detail in the following. However, beside the detailed description, the present invention can also be applied widely in other embodiments and the scope of the present invention is only limited by the appended claims.

Figure 1:
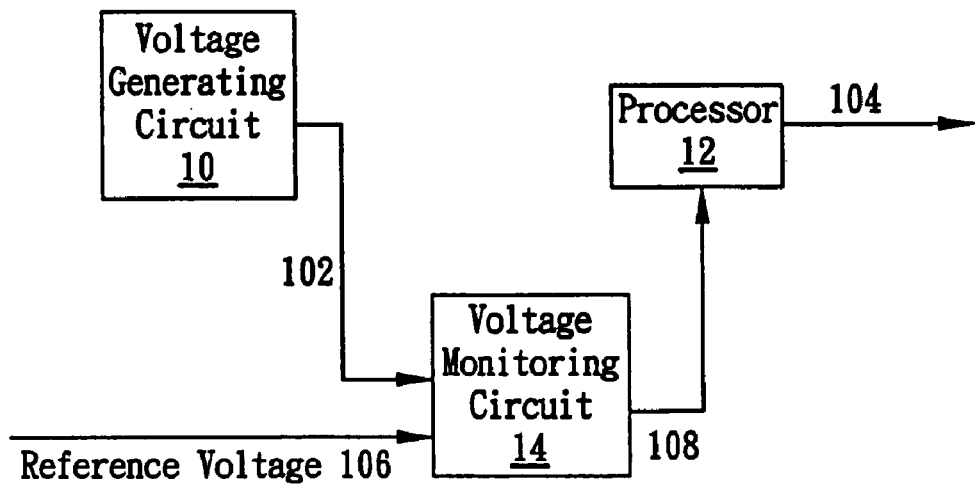
FIG. 1 is a block diagram that depicts an example electronic circuit system.
Figure 2:
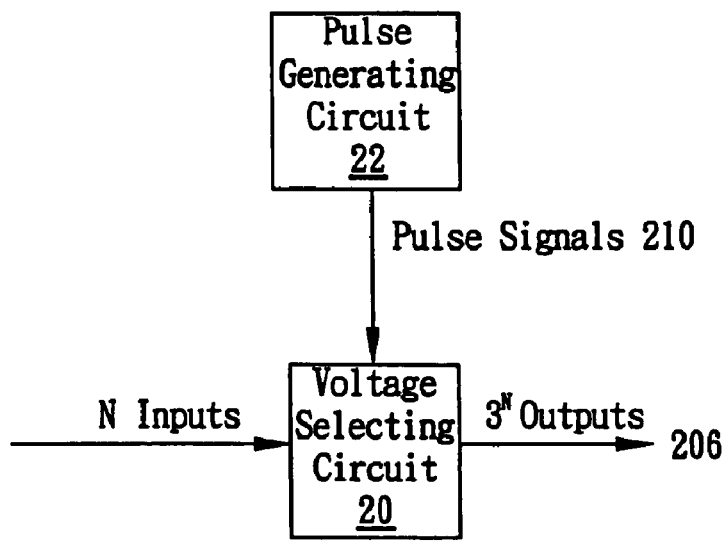
FIG. 2 is a system block diagram for the voltage generating circuit of the present invention.

FIG. 2 is a system block diagram for the voltage generating circuit of the present invention. During system start-up operation (e.g. booting a computer), the pulse generating circuit 22 generates a set of pulses 210 for triggering the voltage selecting circuit 20 to produce an output voltage 206 that has $3^N$ combinations of referenced selecting voltages. Detail descriptions about the generated pulses, the circuitry layout, the reasons why utilize the pulse generating circuit 22 and operations of the voltage selecting circuit 20 will be discussed in the following preferred embodiment of the invention.

Figure 3:
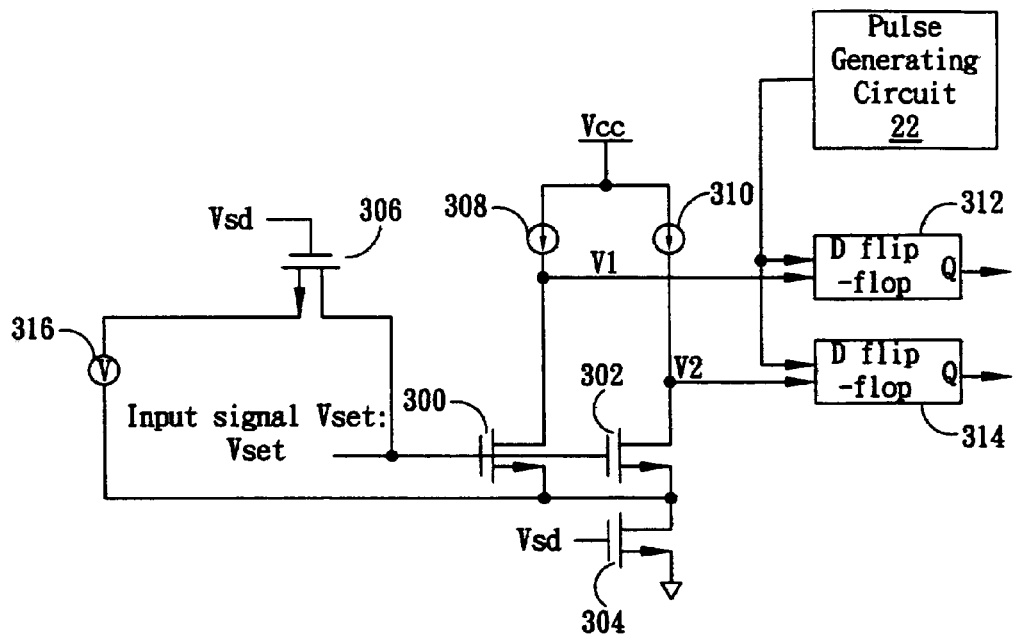
FIG. 3 depicts a preferred embodiment of the voltage selecting circuit 20 shown in FIG. 2.

FIG. 3 depicts a preferred embodiment of the voltage selecting circuit 20 shown in FIG. 2. The voltage selecting circuit 20 includes: a plurality of NMOS transistors 300, 302, 304, and 306; current sources 308 and 310; two D-flip-flops 312 and 314; and an inner voltage-generating unit 316. Among the aforementioned composing devices, NMOS 300, 302 are coupled in common source, each drain of the NMOS transistors is coupled to a current source respectively, and both gates of the NMOS transistors are coupled to an input signal Vset, so that the voltage selecting circuit 20 could generate 3 combinations of output voltages (V1, V2) from the drains of NMOS 300, 302 by different state—high, low, or floating—of the input signal Vset. And, D-flip-flop 312 and 314 lock the output voltage at point V1 and V2 respectively.

To explain how the voltage selecting circuit 20 works, firstly let's ignore whatever the signal Vsd is and assume NMOS 304, 306 are both currently conducted. In an embodiment, the threshold voltage of NMOS 300 is smaller than that of NMOS 302 (or on the contrary), which conducts NMOS 300 but not NMOS 302 when the setting voltage of the input signal Vset is within a range of a particular interval. Therefore, when the setting voltage of the input signal Vset is high and larger than the threshold voltages of both NMOS 300 and 302, NMOS 300 and 302 are both turn-on to make the output voltage V1 and V2 both low for representing a logic "0". When the setting voltage of the input signal Vset is low and smaller than the threshold voltages of both NMOS 300 and 302, NMOS 300 and 302 are both cut-off to make the output voltage V1 and V2 are both high for representing a logic "1". When the input signal Vset is not set (floating) and is within said particular interval, the input signal Vset will have the same potential as the output voltage of the inner voltage-generating unit 316 to conduct NMOS 300 but not NMOS 302, thereby making the output voltage V1, V2 respectively low and high for representing "0" and "1". Accordingly, the voltage selecting circuit 20 generates tri-state output logic by reference to one input control.

To achieve the aforementioned operation result, especially in the case when the input node is floating, the inner voltage-generating unit 316 is designed to produce an output voltage with a value between the threshold voltage of NMOS 300 and NMOS 302, thereby being capable of always conducting one NMOS transistor only at the same moment. For example, assume the threshold voltage of NMOS 300, 302 is 0.45V, 0.82V respectively, the output voltage of the inner voltage-generating unit 316 has to be between 0.45V and 0.82V, for instance 0.67V, to meet the design requirement. The following table shows the relationship between the output voltage V1, V2 and the input signal Vset.

| Input signal Vset | V1 output logic | V2 output logic |
|---|---|---|
| High(>0.82 V) | 0 | 0 |
| Low(<0.45 V) | 1 | 1 |
| Floating(~0.67 V) | 0 | 1 |

Besides, for the sake of avoiding influencing the setting voltage of the input signal Vset when the input node is not floating (especially Vset is low), the output voltage of the inner voltage-generating unit 316 should be designed weaker than the input signal Vset to prevent errors of the output voltage V1 and V2.

NMOS 304 and 306 are used as switches. In previous paragraphs, it assumes that NMOS 304 and 306 are both turn-on and normally operated. To make the input signal Vset have the same voltage as the inner voltage-generating unit 316, firstly it has to turn on NMOS 304. Moreover, in order to generate output voltage V1, V2 that are controlled by input signal Vset, persons skilled in art should realize that NMOS 306 must be turn on, too. With respect to prior art, however, the voltage monitoring circuit will not change anymore after the reference voltage is set. So if we wish the voltage generating circuit consumes as less power as possible, a practical method is to turn off the voltage selecting circuit 20 after D flip-flops have already lock the output voltage. This is why the pulse generating circuit 22 is applied.

Figure 4A:
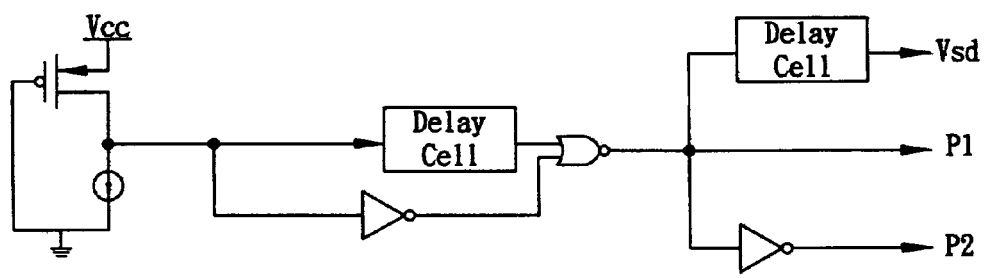
FIG. 4A depicts an example pulse generating circuit 20 shown in FIG. 2.
Figure 4B:
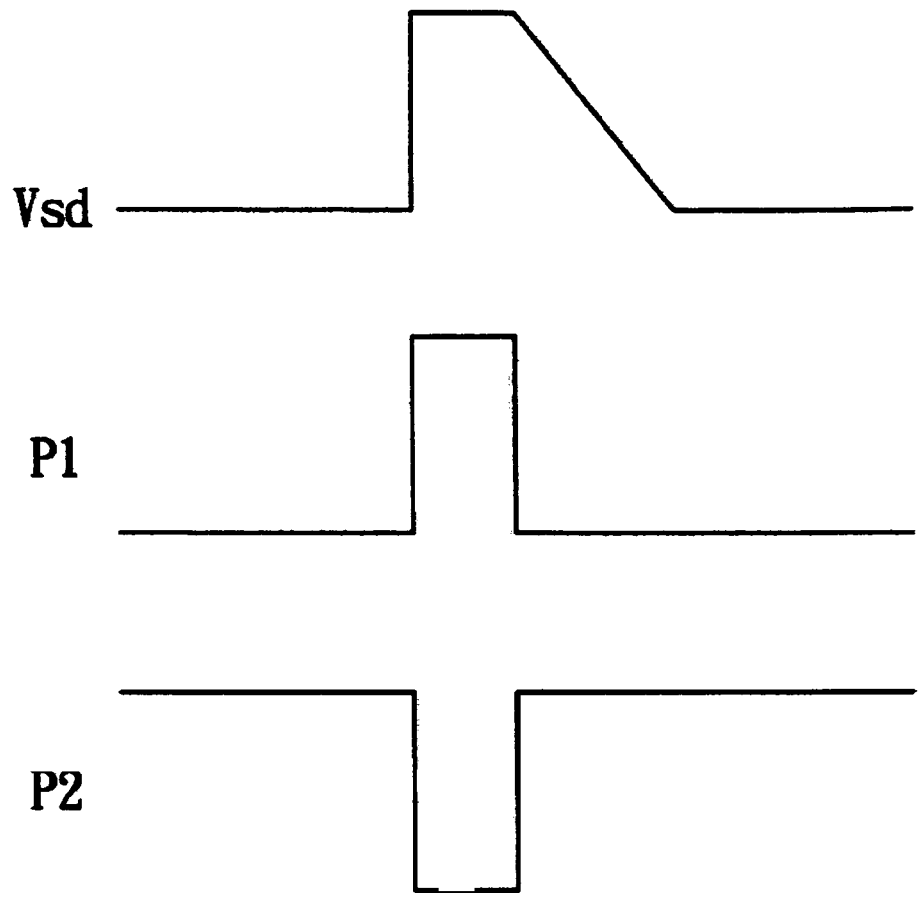
FIG. 4B is a block diagram illustrating the produced pulses of the example pulse generating circuit 20 shown in FIG. 4A.

FIG. 4A depicts a preferred embodiment of the pulse generating circuit 20 shown in FIG. 2, which produces several pulse signals Vsd, p1 and p2 as shown in FIG. 4B. The pulse generating circuit 22 generates three pulse signals Vsd, p1 and p2 to the voltage selecting circuit 20. Among them, pulse Vsd is outputted to the gates of NMOS 304 and 306 to control the conduction of NMOS 304 and 306, and pulse p1 and p2 are both outputted to the D flip-flop 312 and 314. The pulse Vsd conducts NMOS 306 to make the voltage selecting circuit 20 operate normally during a specific period—specially when the system of an electronic device starts working (e.g. booting a computer). In addition, the pulse Vsd also conducts NMOS 304, which makes NMOS 300 and 302 have identical gate voltage when the input signal Vset is floating. During pulse Vsd is high, the voltage selecting circuit 20 operates normally as well as discussed above, and generates different combinations of V1 and V2 in accordance with different setting voltage of the input signal Vset. The pulse p1 and p2 trigger D flip-flop 312, 314 to lock the output voltage V1 and V2. After D flip-flop 312 and 314 lock the output voltage V1 and V2, the pulse Vsd goes low and NMOS 304, 306 go cut-off. Since NMOS 304 is cut-off, NMOS 303 and 302 are cut-off, too. Therefore, the voltage generating circuit 20 generates tri-state output logic by one input control, and since the voltage selecting circuit 20 is shut down after D flip-flops lock the output voltage V1 and V2, the voltage generating circuit of the present invention will induce very low quiescent current.

In foregoing embodiment, the pulse Vsd goes low gradually but not instantly. This is because the pulse Vsd has to keep the voltage selecting circuit 20 on operating to ensure the pulse p1, p2 has already triggered the D flip-flop 312, 314 locking the output voltage V1, V2. An another example method is to extend the signal period of the pulse Vsd. It's noticed that, the present invention does not limit the implementation of the pulse generating circuit 22 or the generated pulses to those shown in FIG. 4A and FIG. 4B only. Any circuit, signal that conducts the NMOS 304, 306 merely during a specific period is also adaptive to the present invention.

Furthermore, the NMOSs in aforementioned embodiments are not limited to enhancement mode NMOSs, the depletion mode NMOSs are also permitted to have better noise margin and smaller layout of the circuitry.

Although the description discloses the preferred embodiment herein, it is not limit the spirit of the invention. It is intended that the specification and examples to be considered as exemplary only, with a true scope and spirit of the invention being indicated by the following claims.

What is claimed is:

1. A voltage generating circuit comprising:
   a pulse generating circuit for generating a plurality of pulses;
   a voltage selecting circuit having an input node and two output nodes, wherein said voltage selecting circuit generates tri-state output logic from said two output nodes in accordance with different setting voltages of said input node, wherein said voltage selecting circuit comprises a pair of NMOS transistors coupled in common source, wherein gates of said pair of NMOS transistors are commonly coupled to said input node and drains of said pair of NMOS transistors form said two output nodes, wherein the NMOS transistors are not electrically operable except when a first switch coupled to the sources of the pair of NMOS transistors is closed by the pulse of the pulse generating circuit;

an inner voltage-generating unit for providing a voltage having one fixed value between threshold voltage of one of the NMOS transistor and threshold voltage of the other of the NMOS transistors, wherein the inner voltage-generating unit provides the voltage to the pair of NMOS transistors under control of the pulse of the pulse generating circuit, thereby preventing waste of power supplying the inner voltage-generating unit; and a plurality of flip-flops coupling to said two output nodes for locking the output voltages of said two output nodes according to the pulses.

2. The voltage generating circuit of claim 1, wherein each said drain of said pair of NMOS transistors further couples to a current source.

3. The voltage generating circuit of claim 1 wherein:
the first switch couples said sources of said pair of NMOS transistors to a voltage source; and
further comprising a second switch for coupling said input node to said inner voltage-generating unit; wherein said plurality of pulses controls said first switch and said second switch.

4. The voltage generating circuit of claim 1, wherein said pair of NMOS transistors has different threshold voltages for turning on only one of said pair of NMOS transistor when said input node is floating.

5. The voltage generating circuit of claim 1, wherein said flip-flops are D flip-flops.

6. A voltage generating circuit capable of generating tri-state output logic in accordance with high, low or floating of an input node, said voltage generating circuit comprises:
a pulse generating circuit for generating a plurality of pulses;
a voltage selecting circuit having a pair of NMOS transistors coupled in common source, wherein each drain of the NMOS transistors is coupled to a current source respectively, both gates of the NMOS transistors are commonly coupled to an input node, and drains of said pair of NMOS transistors generate a pair of output voltage, wherein the NMOS transistors are not electrically operable except when a first switch coupled to the sources of the pair of NMOS transistors is closed by the pulse of the pulse generating circuit;
a plurality of flip-flops, which couple to said drains of the NMOS transistors to lock the output voltage of said pair of NMOS transistors in accordance with said plurality of pulses;
an inner voltage-generating unit for providing a voltage having one fixed value between threshold voltage of one of the NMOS transistor and threshold voltage of the other of the NMOS transistors; and
a plurality of switches controlled by said plurality of pulses for controlling operation of the voltage selecting circuit and the conduction between said inner voltage-generating unit and said input node, wherein the inner voltage-generating unit provides the voltage to the pair of NMOS transistors under control of the pulse of the pulse generating circuit, thereby preventing waste of power supplying the inner voltage-generating unit.

7. The voltage generating circuit of claim 6, wherein said pair of NMOS transistors are enhancement mode NMOS transistors.

8. The voltage generating circuit of claim 6, wherein said pair of NMOS transistors are depletion mode NMOS transistors.

9. The voltage generating circuit of claim 6, wherein said voltage selecting circuit is a voltage divider.

10. The voltage generating circuit of claim 6, wherein said pair of NMOS transistors has different threshold voltages for turning on only one of said pair of NMOS transistor when said input node is floating.

11. The voltage generating circuit of claim 6, wherein said plurality of switches are MOS transistors.

12. The voltage generating circuit of claim 6, wherein said flip-flops are D flip-flops.

13. The voltage generating circuit of claim 6, wherein said plurality of switches comprises: a first switch for coupling said sources of said pair of NMOS transistors to a negative voltage source; and a second switch for coupling said input node to said inner voltage-generating unit.

14. A voltage generating circuit comprising:
a pulse generating circuit for generating a plurality of pulses;
a voltage selecting circuit having an input node and two output nodes, wherein said voltage selecting circuit generates tri-state output logic from said two output nodes in accordance with different setting voltages of said input node, said input node controllably coupling to an inner voltage-generating unit for providing a floating voltage level when said input node is not set, wherein said voltage selecting circuit comprises a pair of NMOS transistors coupled in common source, wherein gates of said pair of NMOS transistors are coupled to said input node and drains of said pair of NMOS transistors form said two output nodes;
a plurality of flip-flops coupling to said two output nodes for locking the output voltages of said two output nodes according to the pulses;
a first switch for coupling said sources of said pair of NMOS transistors to a voltage source; and
a second switch for coupling said input node to said inner voltage-generating unit; wherein said plurality of pulses controls said first switch and said second switch.

15. A voltage generating circuit capable of generating tri-state output logic in accordance with high, low or floating of an input node, said voltage generating circuit comprises:
a pulse generating circuit for generating a plurality of pulses;
a voltage selecting circuit having a pair of NMOS transistors coupled in common source, wherein each drain of the NMOS transistors is coupled to a current source respectively, both gates of the NMOS transistors are coupled to an input node, and drains of said pair of NMOS transistors generate a pair of output voltages;
a plurality of flip-flops, which couple to said drains of the NMOS transistors to lock the output voltage of said pair of NMOS transistors in accordance with said plurality of pulses;
an inner voltage-generating unit coupling to said input node for providing a floating voltage level; and
a plurality of switches controlled by said plurality of pulses for controlling operation of the voltage selecting circuit and the conduction between said inner voltage-generating unit and said input node,
wherein said pair of NMOS transistors are depletion mode NMOS transistors.

16. A voltage generating circuit capable of generating tri-state output logic in accordance with high, low or floating of an input node, said voltage generating circuit comprises:
a pulse generating circuit for generating a plurality of pulses;

a voltage selecting circuit having a pair of NMOS transistors coupled in common source, wherein each drain of the NMOS transistors is coupled to a current source respectively, both gates of the NMOS transistors are coupled to an input node, and drains of said pair of NMOS transistors generate a pair of output voltages;

a plurality of flip-flops, which couple to said drains of the NMOS transistors to lock the output voltage of said pair of NMOS transistors in accordance with said plurality of pulses;

an inner voltage-generating unit coupling to said input node for providing a floating voltage level; and a plurality of switches controlled by said plurality of pulses for controlling operation of the voltage selecting circuit and the conduction between said inner voltage-generating unit and said input node, wherein said plurality of switches comprise: a first switch for coupling said sources of said pair of NMOS transistors to a negative voltage source; and a second switch for coupling said input node to said inner voltage-generating unit.

* * * * *